(No Model.)
P. J. KRAYER.
LOCKING DEVICE FOR BICYCLES, &c.
No. 539,623. Patented May 21, 1895.
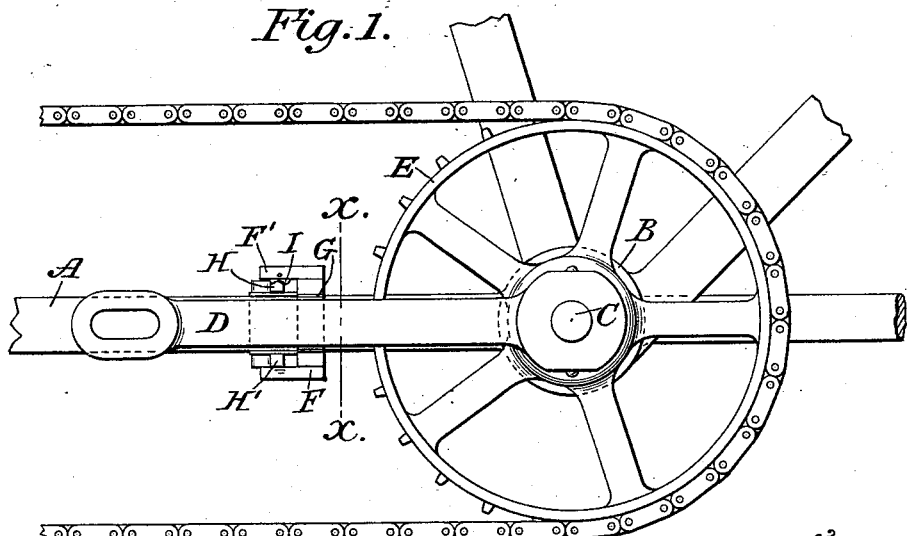
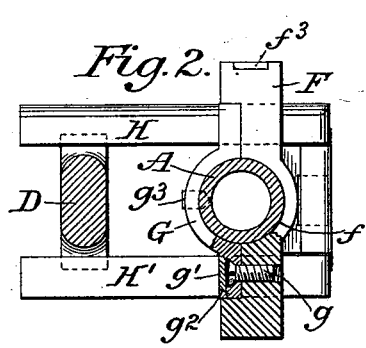
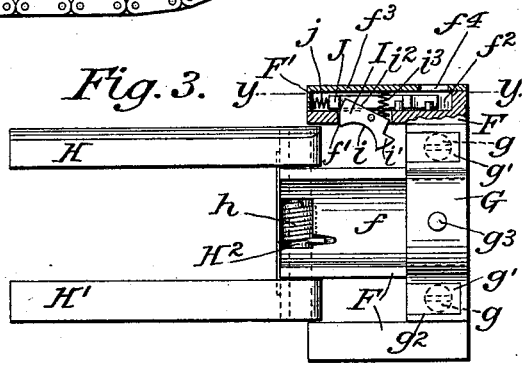
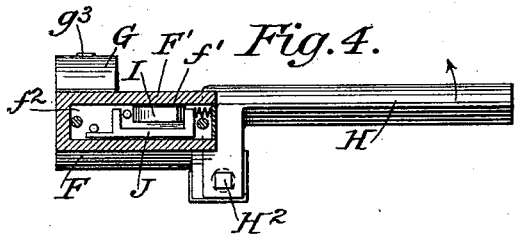
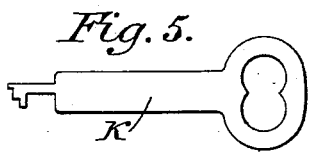
Attest:
A. N. Jestra
A. Stidder
Inventor:
Peter J. Krayer
by William B. Greeley
Atty.

UNITED STATES PATENT OFFICE.

PETER J. KRAYER, OF NEW ROCHELLE, ASSIGNOR OF ONE-HALF TO VALENTINE KRAYER, OF NEW YORK, N. Y.

LOCKING DEVICE FOR BICYCLES, &c.

SPECIFICATION forming part of Letters Patent No. 539,623, dated May 21, 1895.

Application filed September 12, 1894. Serial No. 522,772. (No model.)

*To all whom it may concern:*

Be it known that I, PETER J. KRAYER, of New Rochelle, in the county of Westchester and State of New York, have invented certain new and useful Improvements in Locking Devices for Bicycles, &c.; and I do hereby declare that the following is a full and exact description thereof, reference being had to the accompanying drawings, and to the letters of reference marked thereon, making a part of this specification.

The object of this invention is to produce an improved locking device which is particularly adapted for use on bicycles and the like.

The invention consists in the construction hereinafter described and claimed.

In the accompanying drawings, Figure 1 is a side elevation of a portion of a bicycle-frame and its driving mechanism, showing the mode of application of the improved lock thereto. Fig. 2 is a section on the line $x\ x$ of Fig. 1, upon an enlarged scale. Fig. 3 is a side elevation of the locking device detached from the bicycle-frame with the casing of the lock in section. Fig. 4 is a horizontal section on the line $y\ y$ of Fig. 3. Fig. 5 represents a key which may be used with the lock shown.

I apply the locking device to the frame of the bicycle so that it may engage directly with one of the crank arms and thereby avoid rupturing or bending the more delicate wheel spokes, and I have represented it in the drawings as applied to the horizontal brace A which extends rearwardly from the bearing B in which is mounted the crank shaft C. The crank arm D is ordinarily secured to the shaft C, together with the driving sprocket wheel E and at a certain point in the rotation of the shaft the crank arm lies close to and substantially parallel with the brace A and therefore in position to be engaged most readily by the locking device.

As suggested above the locking device may be applied during the construction of the bicycle and the locking mechanism itself be supported by lugs or projections which are formed upon the brace A, but as it is desirable to provide a device which can be applied to bicycles already constructed and also one which can be removed entirely when necessity arises, I prefer the construction represented in the drawings in which the device is shown as a complete attachment ready for application to any ordinary bicycle. I have therefore provided a block or plate F which is recessed as at $f$, to fit upon the brace A and is adapted to be held rigidly in place upon said brace by a clamping plate G. Upon the block or plate F is pivoted an arm H which can be swung into parallelism with the brace A so as not to interfere with the free movement of the crank arm D, or can be swung to a position at right angles with the brace and project across the path of the crank arm D and prevent its rotation, provision being made for locking the arm H in the latter position. Preferably two arms H and H' are secured together to a short shaft $H^2$ which is mounted in the block F, whereby the crank arm may be embraced between the two arms H and H', and therefore prevent it from making even a partial rotation. A coiled spring $h$ is preferably applied to the shaft $H^2$ to maintain the arms H, H' normally in parallelism with the brace A and therefore out of engagement with the crank arm D.

In the projecting arm F' is mounted a catch I which is adapted to engage the arm H when the latter is swung into position across the path of the crank arm D, and to hold it there until released. The catch is preferably pivoted in a slot $f'$ in the under side of the arm F' and is recessed as at $i$ to engage the arm H in the manner represented in Fig. 1. It is also provided with a projection $i'$ to strike against the under side of the arm F' and prevent further movement of the catch when it is in the position shown in Fig. 1. The upper edge $i^2$ of the catch I, when the parts are in the position indicated in Fig. 1, stands flush with the bottom of a recess $f^2$ which is milled in the arm F'. A spring $i^3$ is applied to the catch I to hold it normally in the position indicated in Fig. 3 in readiness for engagement with the arm H. When the latter is swung in the direction of the arrow in Fig. 4 into the position in which it stands across the path of the arm D the catch I is pressed against the action of the spring $i^3$ into the position indicated in Fig. 1 with its upper edge $i^2$ flush with the bottom of the recess $f^2$. A sliding tumbler J is then pressed by a spring $j$ over the catch I and prevents movement of the latter to release the arm H, the tumbler being held from rising by the cover-plate $f^3$ of the recess. A key K may be inserted through a key-hole $f^4$ to thrust the tumbler J back against the action of the spring $j$ whenever it is desired to release the arm H.

By reason of the form given the arms H, H' as clearly represented in Fig. 4, it will be apparent that when the arms are in position to engage the crank arm D they will stand in close proximity to the plate G. This is taken advantage of to prevent the removal of the attachment from the bicycle except when it is unlocked. The plate G is held in position upon the plate or block F to clamp the brace A between them by screws $g, g$. Were the heads of these screws exposed there would be nothing to prevent the removal of the attachment even when the bicycle is locked, by any person who was so disposed. The screws, however, are deeply sunk in the plate G and each is covered by a slide $g'$ which is slipped into a dove-tailed recess $g^2$ milled in the upper side of the plate G and extending in from one edge but not to the other edge of the same, as clearly represented in Figs. 2 and 3. The plate G may also be provided with a spur $g^3$ to engage the brace A and prevent rotation of the locking device thereon.

When the attachment is unlocked and the parts stand in the position represented in Figs. 3 and 4 the slides $g'$ can be withdrawn by a suitable tool and the heads of the screws $g, g$, exposed so that the attachment can be removed bodily from the bicycle. When the parts, however, are in the position represented in Fig. 2, the arms H, H' stand in close proximity to the ends of the slides $g', g'$, and will therefore prevent their removal.

The mode of use of my improved locking device will now be readily understood. Being either a fixture on the frame of the machine or being applied thereto in the manner described the arms H, H', stand normally in the position represented in Figs. 3 and 4 in which they do not interfere with the movement of the crank arm D. If, however, it is desired to lock the bicycle the crank arm is brought into the position indicated in Fig. 1, and the arms H, H', are then swung into the position indicated in Figs. 1 and 2 in which they stand one at each side of the crank arm and prevent movement thereof. As the arms are swung into this position the arm H strikes the catch I and swings it from the position shown in Fig. 3 into that indicated in Fig 1 in which the catch is itself retained by the tumbler J and prevents the movement of the arm H by its engagement therewith.

It will be observed that the attachment is not only very strong and therefore not liable to be broken but is light in weight and of such simple construction that it can be produced at a comparatively small cost. It will not occasion the breaking or bending of the wheel spokes even if the bicycle is moved forcibly when locked, and it cannot be twisted out of position or otherwise tampered with.

I claim as my invention—

1. In a bicycle, the combination with the frame having a bearing for the crank shaft and having a brace which radiates from said bearing, of a supporting block or plate rigidly secured upon said brace, a short shaft mounted in said block, arms fixed to said shaft and adapted to receive the crank arm between them, a catch mounted upon said block and adapted to engage one of said arms, and a tumbler to engage said catch and prevent movement thereof, substantially as shown and described.

2. In a bicycle, the combination with the frame having a bearing for the crank shaft and having a brace which radiates from said bearing, of a supporting block rigidly secured upon said brace, a short shaft mounted in said block, arms fixed to said shaft and adapted to receive the crank arm between them, a catch pivoted in an arm of said block and recessed to engage said locking arm, and a spring pressed tumbler mounted in a recess in the arm of said block to slide over said catch and prevent movement thereof, substantially as shown and described.

3. A locking attachment for bicycles comprising a supporting block adapted to fit upon the frame of the bicycle a clamping plate held to said block by screws and having a recess over the head of each screw, a slide mounted in each recess and free to move in one direction only, a locking arm pivoted to swing upon said block into the path of a moving part of the bicycle and at the same time into position to prevent the withdrawal of said slide, a catch to engage and hold said arm and means to disengage said catch, substantially as shown and described.

In testimony whereof I have signed my name to this specification in the presence of two subscribing witnesses.

PETER J. KRAYER.

Witnesses:
VALENTINE KRAYER,
RICHARD X. DOOLEY.